US006960315B2

(12) United States Patent
Becker et al.

(10) Patent No.: US 6,960,315 B2
(45) Date of Patent: Nov. 1, 2005

(54) METHOD FOR FORMING MOLDINGS FROM DIMER FATTY ACID FREE POLYAMIDES

(75) Inventors: Bettina Becker, Monheim (DE); Angela Rossini, I-Mailand (IT); Thomas Moeller, Duesseldorf (DE); Thomas Huver, Duesseldorf (DE); Georg Schubert, Moenchengladbach (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 104 days.

(21) Appl. No.: 10/344,618

(22) PCT Filed: Aug. 10, 2001

(86) PCT No.: PCT/EP01/09283

§ 371 (c)(1), (2), (4) Date: Feb. 12, 2003

(87) PCT Pub. No.: WO02/16472

PCT Pub. Date: Feb. 28, 2002

(65) Prior Publication Data

US 2003/0173707 A1 Sep. 18, 2003

(30) Foreign Application Priority Data

Aug. 19, 2000 (DE) ........................................ 100 40 762

(51) Int. Cl.[7] ......................... B29C 45/14; B29C 70/70; B29C 70/88

(52) U.S. Cl. ............................ 264/272.11; 264/328.17; 264/331.18

(58) Field of Search ....................... 264/272.11, 272.16, 264/272.17, 328.17, 328.19, 331.18; 528/310, 312, 322, 338; 525/164

(56) References Cited

U.S. PATENT DOCUMENTS

| | | | | | |
|---|---|---|---|---|---|
| 4,218,351 | A | | 8/1980 | Rasmussen | |
| 4,409,373 | A | | 10/1983 | Wiemers et al. | |
| 4,663,371 | A | | 5/1987 | Arnold et al. | |
| 4,760,125 | A | | 7/1988 | Wiemers et al. | |
| 4,777,238 | A | | 10/1988 | Leoni et al. | |
| 4,791,164 | A | | 12/1988 | Wichelhaus et al. | |
| 4,810,772 | A | | 3/1989 | Leoni et al. | |
| 4,912,196 | A | | 3/1990 | Leoni et al. | |
| 4,914,162 | A | | 4/1990 | Leoni et al. | |
| 4,957,979 | A | | 9/1990 | Albini et al. | |
| 5,138,027 | A | | 8/1992 | Van Beek | |
| 5,250,607 | A | | 10/1993 | Comert et al. | |
| 5,510,405 | A | | 4/1996 | Heucher et al. | |
| 5,548,027 | A | | 8/1996 | Heucher et al. | |
| 5,591,495 | A | * | 1/1997 | Torre et al. | 428/35.7 |
| 5,719,255 | A | | 2/1998 | Heucher et al. | |
| 5,728,800 | A | * | 3/1998 | Gottschalk et al. | 528/310 |
| 5,776,406 | A | | 7/1998 | Schubert et al. | |
| 5,807,968 | A | | 9/1998 | Heinrich et al. | |
| 5,883,172 | A | | 3/1999 | Heucher et al. | |
| 5,912,305 | A | * | 6/1999 | Mc Kee et al. | 525/423 |
| 5,922,831 | A | | 7/1999 | Heinrich et al. | |
| 6,670,442 | B1 | | 12/2003 | Rossini et al. | |

FOREIGN PATENT DOCUMENTS

| | | | |
|---|---|---|---|
| CA | 1 099 447 | | 4/1981 |
| DE | 38 42 294 A1 | | 6/1990 |
| EP | 0 193 746 B1 | | 7/1990 |
| EP | 0 536 681 A1 | | 4/1993 |
| EP | 1 013 694 A1 | | 6/2000 |
| FR | 2 386 573 A1 | | 11/1978 |
| GB | 1 598 209 | * | 4/1998 |
| WO | WO 92/22104 A1 | | 12/1992 |
| WO | WO 95/00364 A1 | | 1/1995 |
| WO | WO 96/20252 A1 | | 7/1996 |
| WO | WO 00/25264 A1 | | 5/2000 |

OTHER PUBLICATIONS

Standard Test Method for Apparent Viscosity of Hot Melt Adhesives and Coating Materials, American Society For Testing and Materials (ASTM 3236) pp. 1–8 (1988).

"Plastics–General principles for the determination of tensile properties", (DIN 53 455) DIN Deutsches Institute for Normung e.V., Berlin, pp. 1–9 (1996).

"Shore A and Shore D hardness testing of rubber", (DIN 53 505), DIN Deutsches Institute for Normung e.V., Berlin, pp. 1–5 (2000).

"Plastics–Determination of water absorption", (DIN 53 495), DIN Deutsches Institute for Normung e.V., Berlin, pp. 1–13 (1999).

"Testing of adhesives for metals and of bonded metal joints", (DIN 53 282), DIN Deutsches Institute for Normung e.V., Berlin, pp. 1–4 (1979).

"Determination of tensile stress/strain properties of rubber", (DIN 53 504), DIN Deutsches Institute for Normung e.V., Berlin, pp. 1–7 (1994).

* cited by examiner

*Primary Examiner*—Angela Ortiz
(74) *Attorney, Agent, or Firm*—Stephen D. Harper; Daniel S. Ortiz

(57) ABSTRACT

Polyamides based on reaction products of $C_4$–$C_{18}$ dicarboxylic acids and diamines are suitable as molding compositions for the production of moldings in the low pressure injection molding process, and for adhesive sealing or filling in the production of electrical or electronic devices, in particular of plugs, cables, switches, sensors, transponders, modules, printed circuit boards or smart cards. In comparison with conventional molding compositions based in known hot melt adhesives, said polyamides exhibit higher strength values, higher abrasion resistance and higher chemical resistance.

25 Claims, No Drawings

METHOD FOR FORMING MOLDINGS FROM DIMER FATTY ACID FREE POLYAMIDES

RELATED APPLICATIONS

This application is filed under 35 U.S.C. 371(c) claiming priority of PCT/EP01/09283 filed Aug. 10, 2001, which claims priority from DE 100 40 762.5 filed Aug. 19, 2000, the contents of each application are incorporated herein by reference.

FIELD OF THE INVENTION

This invention relates to the use of hot melt adhesives for the production of moldings and to a process for the production of such moldings.

BACKGROUND OF THE INVENTION

EP 0 193 746 describes a process for the production of adhesive bonds and coatings from a melt of thermoplastic polyamides, wherein the polyamides used are block copolymers which have been obtained by reacting a) polyamides of a substantially linear structure, terminated with carboxylic acid functions and/or amine groups and based on dimerized fatty acids and aliphatic or cycloaliphatic diamines with
b) substantially linear aliphatic polyethers having isocyanate terminal groups and/or the reaction products thereof with 2,3-epoxypropanol, wherein the block polymers contain no free isocyanate or epoxide groups.

These block copolymers may be used with conventional commercial hot melt adhesive guns for bonding various materials. The bonds exhibit good tensile shear strength and good low temperature flexibility; said document does not disclose the production of moldings or molded articles from these block copolymers.

WO 95/00364 describes moldings made from thermoplastic poly(amide-urethane) block copolymers. Said document describes cable harnesses with retaining elements which are injection moldings which enclose at least the outer surface of the bundled leads at the fastening points. The moldings may take the form of pass-through or insertion bush. The hot melt adhesive used should preferably crosslink, in particular with atmospheric moisture. Said adhesive should furthermore be rubbery, flame-resistant and partially crystalline. The moldings are produced by a) placing the portions of the bundled leads to be fastened into an injection mold,
b) closing the mold,
c) injecting the molten molding composition into the mold up to a pressure of 0 to 30 bar, in particular of 5 to 30 bar, and applying an identical holding pressure,
d) waiting until solidification has occurred by cooling,
e) opening the mold and
f) demolding.

The technical information leaflet “Macromelt-Moulding” dated March 1994 from Henkel KGaA describes moldings made from the hot melt adhesive “Macromelt”. The process described therein is suitable for injection molding encapsulation of inserts made from plastics. By virtue of Macromelt’s good adhesion, high levels of impermeability and strength are achieved with the encapsulated molding. Due to the relatively low viscosity of the hot melt adhesive Macromelt, it is possible to pump it into the injection mold under only low pressure, such that it can flow around even filigree components without causing damage, so sealing and protecting them. Macromelt exhibits very good adhesion to polar (for example PVC, PA 6,6 and PU) and non-polar (for example PP) plastic surfaces. The moldings are produced by converting the Macromelt into its low viscosity molten state solely by input of heat. The melt is pumped into a cold mold, where the heat is drawn back out of it. Depending upon the mass (quantity of heat) involved, this operation normally takes only a few seconds, whereupon the finished molding may be removed from the mold. Processing is performed on special processing machinery, which automatically and thus reliably controls material flow from melting up to the mold. The technical information leaflet provides no details of exactly what the hot melt thermoplastic molding material is based upon. Polyamide-based products are, however, offered for sale commercially.

WO 92/22104 describes a connector for electrically conductive cables, in particular for coaxial cables, which is characterised by the use of a hot melt adhesive having a melt viscosity of greater than 8000 mPa.s at 200° C. Said adhesive simultaneously performs bonding, sealing, filling and insulating functions. Thus, in the present case, the intention is not only to bond the connector firmly to the cable, but additionally to prevent penetration of in particular moisture and dust between the cable and the outer sleeve and between the contact sleeve and the insulating hot melt adhesive. The principal constituents of the hot melt adhesive are a polyamide based on dimerised fatty acid, aliphatic amines and modifying additives together with a copolyethylene and auxiliary substances. The resultant plugs meet elevated electrical, thermal and other requirements.

DE 38 42 294 relates to a cable connector for a high frequency coaxial cable. In this case a polyurethane plastic is used as plastics filling.

U.S. Pat. No. 5,250,607 describes a moisture-curing, extrudable thermoplastic sealant which substantially consists of two components, namely a) a prepolymer having approx. 2 isocyanate terminal groups per molecule which react together in the presence of ambient moisture and
b) a plasticised PVC.

By virtue of their elasticity, these sealants are suitable, inter alia, as a sealing embedding material in electrical connectors. This polymer blend may also be used to produce films, tubes, drum lid seals or tapes.

WO 96/20252 describes molding compositions based upon moisture-curing PU hot melt adhesives and the use thereof for the production of moldings. The PU hot melt adhesives are intended to have a melt viscosity of less than 100 Pa.s at the processing temperature of 70 to 190° C. The moldings are produced by melting the molding composition at temperatures of 70 to 200° C., injecting the melt into closed molds at an excess pressure of 1 to 50 bar, demolding the cooled moldings after a short time and then performing curing with atmospheric moisture. Economic and technical advantages stated in said document are distinctly reduced processing pressure, machine costs and mold costs as well as good adhesion of the molding compositions onto various substrates. The moldings are intended to be heat resistant and in particular be suitable for the production of electrical components.

WO 00/25264 describes the use of thermoplastic hot melt adhesives for the production of the component layers in smart cards or for the production of electronic transponders using a low pressure injection molding process at pressures of between 1 and 50 bar. According to the teaching of said document, suitable hot melt adhesives for this process are those based on polyurethanes, polyesters, atactic polypropylene, ethylene/vinyl acetate (EVA) copolymers, low molecular weight ethylene copolymers or polyamides, wherein polyaminoamides based on dimerized fatty acids are in particular suggested as polyamides.

Hot melt adhesives are thus already widely used in the prior art for sealing electronic components and for producing moldings, wherein, while known polyamide hot melt adhesives based on dimer fatty acid do indeed exhibit a range of advantageous properties, such as low viscosity, favorable rheology in low pressure processes, good adhesion properties and flexibility, there is still a requirement for molding compositions which exhibit better mechanical strength, hardness, abrasion resistance, chemical resistance and heat resistance.

The problem forming the basis of the invention was to provide compositions for use as molding compositions which are suitable for the low pressure injection molding process and which in particular exhibit better strength, hardness, chemical resistance and heat resistance.

BRIEF DESCRIPTION OF THE INVENTION

The solution to this problem according to the invention is stated in the claims. Said solution substantially comprises the provision of polyamides based on reaction products of $C_4$ to $C_{18}$ dicarboxylic acids and diamines, which polyamides contain no dimer fatty acid units and are suitable as molding compositions for the production of moldings by the low pressure injection molding process.

The present invention also provides a process for the production of moldings for the electrical and electronics industry, in which the molding compositions based on dimer 70° C. to 230° C., this melt is injected in a low pressure injection molding process at injection pressures of 0.5 to 100 bar, preferably of 1.0 to 50 bar, into the closed molds or cavities and the cooled moldings are removed from the molds after a short time.

DETAILED DESCRIPTION OF THE INVENTION

The polyamides to be used according to the invention are produced from

- 80 to 100 mol %, preferably 100 mol %, of one or more $C_4$–$C_{18}$ dicarboxylic acid(s)
- 10 to 100 mol %, preferably 30 to 80 mol %, of at least one aliphatic diamine
- 10 to 80 mol %, preferably 45 to 60 mol %, of one or more cycloaliphatic diamines 0 to 80 mol %, preferably 10 to 50 mol %, of polyether diamines, wherein the sum total of diamines used amounts to 100 mol %, such that the dicarboxylic acid component and diamine component are present in approximately equivalent molar quantities.

The dicarboxylic acids are preferably used in an approx. 10% stoichiometric excess relative to the diamines, such that carboxyl-terminated polyamides are obtained. The molecular weight of the polyamides to be used according to the invention (calculated from the acid value) is approx. 10000 to 50000, preferably 15000 to 30000, particularly preferably between 15000 and 20000. This results in a viscosity of the polyamides to be used according to the invention of between 100 and 50000 mPa.s, preferably of between 2000 and 30000 mPa.s, measured at 200° C. in accordance with ASTM D 3236.

Examples of dicarboxylic acids for the production of the polyamides according to the invention are in particular succinic acid, glutaric acid, adipic acid, pimelic acid, suberic acid (octanedioic acid), azelaic acid, sebacic acid, undecanedioic acid or dodecanedioic acid or mixtures thereof.

The diamine component substantially consists of one or more aliphatic diamines, preferably having an even number of carbon atoms, wherein the amino groups are at the terminus of the carbon chains. The aliphatic diamines may contain 2 to 20 carbon atoms, wherein the aliphatic chain may be linear or slightly branched. Specific examples are ethylenediamine, diethylenetriamine, dipropylenetriamine, 1,4-diaminobutane, 1,3-pentanediamine, methylpentanediamine, hexamethylenediamine, trimethylhexa-methylenediamine, 2-(2-aminomethoxy) ethanol, 2-methylpentamethylenediamine, $C_{11}$-neopentanediamine, diaminodipropylmethylamine, 1,12-diaminododecane. Particularly preferred aliphatic diamines are $C_4$–$C_{12}$ diamines having an even number of carbon atoms.

The amino component may furthermore contain cyclic diamines or heterocyclic diamines, such as 1,4-cyclohexanediamine, 4,4'-diaminodicyclohexylmethane, piperazine, cyclohexanebis(methylamine), isophoronediamine, dimethylpiperazine, dipiperidylpropane, norbornanediamine and m-xylylenediamine.

If the polyaminoamide is to exhibit relatively high flexibility, polyoxyalkylenediamines such as polyoxyethylenediamines, polyoxypropylenediamines or bis-(diaminopropyl)polytetrahydrofuran may additionally also be used. Of these, the polyoxyalkylenediamines, also known as "Jeffamines" (commercial name of Huntsman), are particularly preferred. The molecular weight of the Jeffamines used is between 150 and 4000, preferably between 200 and 2000.

Aminocarboxylic acids or the cyclic derivatives thereof may furthermore be used. Examples which may be mentioned are 6-aminohexanoic acid, 11-aminoundecanoic acid, laurolactam and ε-caprolactam.

The compositions according to the invention may also contain further additives conventional in hot melt adhesives, examples which may be mentioned being tackifying resins, for example abietic acid, abietic acid esters, terpene resins, terpenephenolic resins and hydrocarbon resins. Subordinate quantities of fillers, such as silicates, talc, calcium carbonates, clays, carbon black, and coloring pastes or pigments may furthermore be used under certain circumstances.

Depending upon the particular application, it may be appropriate to stabilise the hot melt adhesive against degradation. Suitable antioxidants are in particular antioxidants of the sterically hindered phenol or aromatic amine derivative type in quantities of up to 1.5 wt. %, relative to the binder. Examples which may be mentioned are the products commercially available under the commercial names Irganox 1010, 1076, 3114 or 1425 from Ciba Specialty Chemicals and under the commercial names Topanol O from ICI or Goodrite 3114 from B. F. Goodrich.

The hot melt adhesives according to the invention preferably contain no solvents. Such solvents are taken to mean inert, organic compounds having a boiling point of up to 200° C. at standard pressure.

The hot melt adhesives to be processed may assume various forms for processing, for example tablets, pellets or bars or a compact block cast in a drum. The hot melt adhesives preferably assume pellet form.

Moldings are produced from these molding compositions by shaping under the action of mechanical forces within a certain temperature range, this operation in principle proceeding by any known processing method, for example by extrusion, casting, injection molding, pressing, transfer molding, extrusion etc. However, according to the invention, the molding composition is converted into moldings by low pressure injection molding. This injection molding cycle comprises the following individual steps:

a) The mold is closed, once any parts to be joined together have been inserted.

b) The molten molding composition is injected into the mold up to a pressure of between 0.5 and 100 bar, preferably from 1.0 to 50 bar, and holding pressure is optionally applied.

c) The molding composition is allowed to solidify by cooling.

d) The mold is opened.

e) The injection moldings are removed from the mold.

The hot melt adhesives are particularly suitable for simultaneous bonding, sealing and filling, as is required, for example, for connectors for electrically conductive cables, in particular for coaxial cable. Such connectors may be produced substantially in the following manner: the stripped cable is connected to the contact sleeve or contact pin (for example by soldering or crimping) and inserted into the outer sleeve. This assembly is placed on a counterpart, i.e. a plug mold, if a sleeve is to be produced. The resulting cavity is filled, either completely or partially in a defined manner, under pressure with the melt of the hot melt adhesive. The melt may, for example, be injected through an annular nozzle or injection nozzle (injection molding). It is advantageous if the nozzle is initially located as far as possible inside the outer sleeve and is pressed outwards as the mold fills.

In particular, it is possible to draw a shrinkable tube or article over the connector and the cable and to shrink it horizontally by heating to above 150° C. The connectors are impermeable up to an excess pressure of at least 0.3 at. Both during manufacture and during normal use the connector sleeves and pins, even in the case of large connectors, are located in exactly the desired position, even without any additional fixing aids. If, however, so little hot melt adhesive is used that the connector sleeves or pins protrude considerably, an additional fixing disk at the beginning of the sleeves or pins may be of use. Despite the elevated viscosity, no harmful cavities are obtained.

Similarly, the hot melt adhesives to be used according to the invention are suitable for sealing and embedding switches, sensors, transponders, other electrical and electronic modules, printed circuit boards or also for encapsulating electrical or electronic components such as electronic circuits (chips) as are used in modern identity, credit, bank and telephone cards ("smart" cards). Other applications are, for example, potting and encapsulation of electronic and electrical components in the automotive sector, such as aerials and their amplifiers. While it has indeed already been proposed to used hot melt adhesives for low pressure injection molding, in particular polyamides based on dimer fatty acids have previously been proposed, which have a low melt viscosity and thus exhibit favourable rheology in the low pressure process. They are also distinguished by good adhesive properties and good flexibility.

In comparison with the hot melt adhesives to be used according to the prior art, the hot melt adhesives to be used according to the invention additionally exhibit the following advantageous properties:

- mechanical strength, such as tensile strength, is very high; high strength values may be achieved simultaneously combined with elevated elongation values, which ensure the flexibility of the material.
- the moldings produced in this manner exhibit a very high surface hardness (Shore D), so ensuring not only a decisive improvement in abrasion resistance, but also improved optical quality of the surface of such moldings. This characteristic also improves demolding properties, such that cycle times in the molding process may be reduced.
- the moldings exhibit good chemical resistance, for example on contact with petrol and engine oil, in particular making it possible to use them in the automotive sector.
- as embedding compositions, they exhibit excellent PVC adhesion, as manifested by very high T-peel strength values. In the case of adhesive bonds with cable insulation material consisting of plasticised PVC (containing plasticiser), material failure occurs in the PVC, so ensuring excellent impermeability results.
- in comparison with conventional hot melt adhesives, heat resistance is also considerably improved, which also permits use in vehicle construction.

Such advantageous properties have hitherto only been achieved with alternative systems to the molding process based on two-component embedding systems, such as epoxides and polyurethanes. These two-component embedding systems are known to exhibit a range of disadvantages, they require long curing times and mechanical fixing of the potted components. Since this is generally performed manually, this process is costly. Moreover, two-component embedding systems frequently contain hazardous substances which entail costly occupational hygiene measures.

The following tests of underlying principles are intended to illustrate the invention, wherein selection of the Examples is not intended to restrict the scope of the subject matter of the invention, but instead merely to provide examples demonstrating the mode of action of the hot melt adhesives to be used according to the invention.

EXAMPLES

Example 1

A polyamide was produced in a manner known per se from 100 mol % dodecanedioic acid, 50 mol % piperazine, 20 mol % Jeffamine D 400 and 30 mol % diaminohexane by a condensation reaction with removal of the water of reaction. This polyamide exhibited the following characteristic values: acid value: 15 mg KOH/g, melt viscosity: 17200 mPa.s at 200° C., softening point: 160° C.

Example 2

A polyamide was produced in the same manner from 100 mol % sebacic acid, 48 mol % piperazine, 33 mol % Jeffamine D 400 and 19 mol % ethylenediamine. Its characteristic values were: acid value: 8.2 mg KOH/g, melt viscosity: 17000 mPa.s at 200° C., softening point: 175° C.

The principal characteristics of the polyamides according to Examples 1 and 2 were tested. To this end, Table 1 compares the tensile strength, elongation at break, Shore hardness and chemical resistance of the polyamides according to Examples 1 and 2 with prior art polyamides. Polyamides "Macromelt OM 622" and "Macromelt 6208" are dimer fatty based polyamides from Henkel KGaA, which have previously successfully been used for many applications in the "Macromelt Moulding" process. It is clear from the comparison of the Examples according to the invention with the prior art Examples that the polyamides to be used according to the invention have substantially higher tensile strengths and exhibit substantially higher Shore D hardness values, while nevertheless exhibiting a very high elongation at break. Tensile strength and elongation were measured in accordance with DIN 53455, Shore D hardness in accordance with DIN 53505. Chemical resistance to petrol and engine oil was measured on the basis of DIN 53495, wherein the percentages state the increase in weight of the molding. A small increase in weight shows that the test medium has been only slightly absorbed by the molding and has thus been able to soften it only slightly. PVC adhesion was measured as T-peel strength on the basis of DIN 53282; in the tests according to the invention, material failure occurred in the PVC, whereas in the case of the prior art polyamides, while relatively high peel strength values were achieved, it was the adhesive bond itself which failed. Material failure in the Examples according to the invention demonstrates that such bonds will exhibit excellent impermeability.

Table 2 shows further polyamide hot melt adhesives according to the invention. It is clear from this table that tensile shear strength (TSS in MPa) on PVC always results in material failure (MF). This is again an indication of very good adhesion of the hot melt adhesives to be used according to the invention in bonds with PVC materials, as are widely used in the electrical and electronics industry. The table also reveals that elongation at break (EB) and modulus of elasticity ($E_{100}$ at 100% elongation) may be varied within broad limits by the selection of the structural units in the polyamide. EB and $E_{100}$ were determined on the basis of DIN 53504. Melt viscosity was measured at 200° C. in accordance with ASTM D 3236 [Pa.s].

TABLE 1

| | Example 1 | Macromelt OM 633 Comparison 1 | Example 2 | Macromelt 6208 Comparison 2 |
|---|---|---|---|---|
| Tensile strength | 15 MPa | 5.2 MPa | 25 MPa | 3.6 MPa |
| Elongation at break | 330% | 400% | 640% | 650% |
| Shore D hardness | 57 | 30 | 40 | 20 |
| Resistance* | | | | |
| Petrol | | | | |
| 1 h | 0.02% | 1.0% | 0.05% | 1.0% |
| 24 h | 0.1% | 5.2% | 0.3% | 6.5% |
| Oil | | | | |
| 1 h | 0.1% | 0.3% | 0.1% | 0.4% |
| PVC adhesion | MF, PVC | 9.0 N/mm | MF, PVC | 7.5 N/mm |

TABLE 2

| Example | Components in mol % | | TSS on PVC | Melt viscosity | EB [%] | $E_{100}$ [MPa] |
|---|---|---|---|---|---|---|
| 3 | Dodecanedioic acid | 101.52 | 5.81 MF | 20 | 255.4 | 13.43 |
| | Piperazine | 49.24 | | | | |
| | Jeffamine D230 | 19.70 | | | | |
| | Diaminohexane | 29.54 | | | | |
| 4 | Dodecanedioic acid | 101.52 | 3.43 MF | 20.1 | 123.5 | 23.8 |
| | Piperazine | 54.18 | | | | |
| | Jeffamine D230 | 14.78 | | | | |
| | Diaminohexane | 29.54 | | | | |
| 5 | Dodecanedioic acid | 101.52 | 5.76 MF | 17.2 | 327.1 | 14.53 |
| | Piperazine | 54.26 | | | | |
| | Jeffamine D230 | 11.68 | | | | |
| | Diaminohexane | 32.54 | | | | |
| 6 | Dodecanedioic acid | 101.52 | 3.2 MF | 17.7 | 119.5 | 22.8 |
| | Piperazine | 49.24 | | | | |
| | Jeffamine D230 | 14.78 | | | | |
| | Diaminohexane | 34.48 | | | | |

TABLE 2-continued

| Example | Components in mol % | | TSS on PVC | Melt viscosity | EB [%] | $E_{100}$ [MPa] |
|---|---|---|---|---|---|---|
| 7 | Dodecanedioic acid | 101.00 | 4.2 MF | 14.5 | 151 | 24.36 |
| | Piperazine | 49.48 | | | | |
| | Jeffamine D230 | 14.84 | | | | |
| | Diaminohexane | 34.66 | | | | |
| 8 | Dodecanedioic acid | 76.14 | 5.47 MF | 10.8 | 144.7 | 21.9 |
| | Azelaic acid | 25.38 | | | | |
| | Piperazine | 49.24 | | | | |
| | Jeffamine D230 | 14.78 | | | | |
| | Diaminohexane | 34.48 | | | | |
| 9 | Dodecanedioic acid | 101.00 | 5.14 MF | 66.3 | 235 | 23.7 |
| | Piperazine | 49.48 | | | | |
| | Jeffamine D230 | 14.84 | | | | |
| | Diaminohexane | 34.66 | | | | |
| 10 | Sebacic acid | 101.42 | 9.7 MF | 16.9 | 136 | 26.83 |
| | Piperazine | 49.98 | | | | |
| | Jeffamine D230 | 14.70 | | | | |
| | Diaminohexane | 34.30 | | | | |

What is claimed is:

1. A method for producing moldings by an injection molding process which comprises:

1) introducing into an injection mold a molten polyamide formed by reaction of a mixture comprising:
   a) 80 to 100 mol %, of at least one aliphatic $C_4$–$C_{18}$ dicarboxylic acid wherein the at least one aliphatic $C_4$–$C_{18}$ dicarboxylic acid is selected from the group consisting of succinic acid, glutaric acid, adipic acid, pimelic acid, suberic acid, azelaic acid, sebacic acid, undecanedioic acid, dodecanedioic acid, and mixtures thereof;
   b) 10 to 90 mol % of at least one aliphatic diamine containing from 2 to 20 carbon atoms;
   c) 10 to 80 mol % of at least one cycloaliphatic diamine; and
   d) 0 to 80 mol % of at least one polyether diamine, wherein the polyamide contains no dimer fatty acid residues and the sum total of diamines amounts to 100 mol %; and
2) cooling the polyamide.

2. The method of claim 1 wherein the dicarboxylic acid residues are present at up to 10% molar excess relative to the diamine residues.

3. The method of claim 2 wherein the polyamide contains about equivalent molar residues of the dicarboxylic acid and the diamine.

4. The method of claim 1 wherein the polyamide contains residues of aminocarboxylic acids.

5. The method of claim 1 wherein the molten polyamide is at a temperature of from 70° C. to 230° C.

6. The method of claim 1 wherein the polyamide has a viscosity, measured in accordance with ASTM D 3236 at 200° C., between 100 and 50,000 mPa.s.

7. The method of claim 6 wherein the viscosity is between 2000 and 30,000 mPa.s.

8. The method of claim 5 wherein the molten polyamide is introduced into the mold at a pressure of 0.5 to 100 bar above atmospheric pressure.

9. The method of claim 8 wherein the polyamide has a viscosity, measured in accordance with ASTM D 3236, at 200° C. between 100 and 50,000 mPa.s.

10. The method of claim 8 wherein the pressure is from 1.0 to 50 bar.

11. The method of claim 1 wherein the mold is a closed mold containing at least one insert.

12. The method of claim 1 wherein the mold comprises a mold for sealing, embedding or filling a member selected from the group consisting of plugs, cables, switches, sensors, transponders, modules, printed circuit boards, electrical and electronic components and smart cards.

13. The method at claim 2 wherein the mold comprises a mold for sealing, embedding or filling a member selected from the group consisting of plugs, cables, switches, sensors, transponders, modules, printed circuit boards, electrical and electronic components and smart cards.

14. The method of claim 3 wherein the mold comprises a mold for sealing, embedding or filling a member selected from the group consisting of plugs, cables, switches, sensors, transponders, modules, printed circuit boards, electrical and electronic components and smart cards.

15. The method of claim 5 wherein the mold comprises a mold for sealing, embedding or filling a member selected from the group consisting of plugs, cables, switches, sensors, transponders, modules, printed circuit boards, electrical and electronic components and smart cards.

16. The method of claim 6 wherein the mold comprises a mold for sealing, embedding or filling a member selected from the group consisting of plugs, cables, switches, sensors, transponders, modules, printed circuit boards, electrical and electronic components and smart cards.

17. The method of claim 8 wherein the mold comprises a mold for sealing, embedding or filling a member selected from the group consisting of plugs, cables, switches, sensors, transponders, modules, printed circuit boards, electrical and electronic components and smart cards.

18. The method of claim 1 wherein the polyamide is formed by reaction of a mixture comprising:

a) 80 to 100 mol %, of at least one aliphatic $C_4$–$C_{18}$ dicarboxylic acid;

b) 30 to 80 mol % of the at least one aliphatic diamine;

c) 10 to 60 mol % of at least one cycloaliphatic diamine;

d) 10 to 50 mol % of at least one polyetherdiamine.

19. The method of claim 1 wherein the polyamide is formed by reaction of a mixture comprising;

a) 100 mol % of at least one aliphatic $C_4$–$C_{18}$ dicerboxylic acid;

b) 30 to 80 mol % of the at least one aliphatic diamine;

c) 45 to 60 mol % of at least one cycloaliphatic diamine; and d) 10 to 50 mol % of at least one polyetherdiamine.

20. The method of claim 1 wherein the at least one aliphatic diamine is selected from the group consisting of ethylenediamine, diethylenetriamine, dipropylenetriamine, 1,4-diaminobutane, 1,3-pentanediamine, methylepentanediamine, hexamethylenediamine, trimethylhexamethylenediamine, 2-(2-aminomethoxy) ethanol, 2-methylpentamethylenediamine, $C_{11}$-neopentanediamine, diaminodipropylmethylamine, 1,12-diaminododecane, and mixtures thereof.

21. The method of claim 1 wherein the at least one aliphatic $C_4$–$C_{18}$ dicarboxylic acid is selected from the group consisting of azelaic acid, sebacic acid, dodecanedioic acid, and mixtures thereof, the at least one aliphatic diamine is selected from the group consisting of diaminohexane, ethylenediamine and mixtures thereof, the at least one cycloaliphatic diamine is piperazine, and the at least one polyether diamine is a polyoxypropylene diamine.

22. The method of claim 1 wherein the at least one cycloaliphatic diamine is selected from the group consisting of 1,4-cyclohexanediamine, 4,4'-diaminodicyclohexylmethane, piperazine, cyclohexanebis (methylamine), isophoronediamine, dimethylpiperazine, norbornanediamine, dipiperidylpropane, and mixtures thereof.

23. The method of claim 1 wherein said mixture comprises a polyoxypropylene diamine.

24. The method of claim 1 comprising an additional step wherein a part is inserted into the injection mold before step 1.

25. The method of claim 1 comprising an additional step wherein at least one part selected from the group consisting of switches, sensors, transponders, electrical and electronic mdules, printed circuit boards, and electrical and electronic components is inserted into the injection mold before step 1.

* * * * *

UNITED STATES PATENT AND TRADEMARK OFFICE

CERTIFICATE OF CORRECTION

PATENT NO. : 6,960,315 B2
APPLICATION NO. : 10/344618
DATED : November 1, 2005
INVENTOR(S) : Becker et al.

It is certified that error appears in the above-identified patent and that said Letters Patent is hereby corrected as shown below:

Column 9, line 10, delete “at” and insert therefor --of--.

Column 10
Line 3, delete “dicerboxylic” and insert therefor --dicarboxylic--.
Line 40, delete “mdules” and insert therefor --modules--.

Signed and Sealed this

First Day of August, 2006

JON W. DUDAS
*Director of the United States Patent and Trademark Office*